United States Patent Office 3,268,473
Patented August 23, 1966

3,268,473
POLYSILOXANE GUM CREPE AGING PREVEN-
TIVE: HYDROXYLATED SILICON COMPOUND
WITH AMMONIUM CARBONATE OR BICAR-
BONATE
Eric D. Brown, Midland, Mich., assignor to Dow Corning
Corporation, Midland, Mich., a corporation of
Michigan
No Drawing. Filed June 24, 1963, Ser. No. 290,203
12 Claims. (Cl. 260—37)

This application is a continuation-in-part of applicant's copending application Serial No. 169,654, filed January 29, 1962, now abandoned.

This invention relates to a method of preparing a stable organosiloxane mixture that can thereafter be vulcanized to a solid coherent silicone rubber, which involves heating a mixture of an organosilicon polymer, a filler, an organosilicon compound containing silicon-bonded hydroxyl radicals and a salt selected from a group consisting of ammonium carbonate and ammonium bicarbonate.

Silicone rubber has found many uses by reason of its stability and rubberiness over a wide temperature range from about −100° C. to over 250° C. for considerable lengths of time. Its utility has been increased through the availability of stronger elastomers. The principal reason for the gain in strength of silicone rubber has been in the use of finely divided fillers having a high surface area, particularly silica fillers. These high surface area fillers were found to be active in that mixtures of a polymer and one or more of these fillers would quickly harden and stiffen spontaneously upon standing to an unworkable mass that could be rendered useable again, even so for a very brief time, only by extensively milling the mixture on a rubber mill. This phenomenon has been called by several names, among them "crepe hardening" and "structure development." Such a mixture was not commercially satisfactory because of this property.

Many methods have been disclosed that are now well known in the art and practiced commercially, which methods retard crepe hardening sufficiently that the silicone mixture can be shaped, extruded, or otherwise fabricated, without the need for frequent remilling. One of these methods involves the addition of hydroxylated siloxanes to the mixture of polysiloxane and filler as described in Konkle et al., U.S. Patent 2,890,188. This method required a careful balance of hydroxylated siloxane with respect to a combination of factors due to both the polymer and the filler. If a sufficient amount of hydroxylated siloxane were used to completely prevent structure buildup, the resulting mixture was often either too soft or too sticky or both, making its fabrication very difficult. As well, the strength of the vulcanized rubber was usually lower. If an amount of hydroxylated siloxane were used such that the mixture was not soft or sticky, and would vulcanize to a high strength rubber, the rate of structure buildup was often fast enough that a mass of the mixture would develop structure in a short while, so that the "working time," or time that portions of this mass could be fabricated was short, whereupon the unvulcanized mixture had to be "resoftened" by remilling.

In practice it is necessary to determine experimentally the balance of hydroxylated siloxane to the polymer and filler employed each time one of the materials of the said mixture is changed. At the best compromise the mixture is somewhat soft and sticky, developing structure quite slowly over a period of hours to days at room temperature, and the vulcanized rubber usually does not have as much strength as mixtures from which the hydroxylated siloxane is omitted. Thus, this method required a careful control of materials, and even at best, gave only a compromise in desirable properties of the mixture both before and after vulcanization.

Recently, French Patent 1,237,927 discloses a procedure whereby a mixture of a silicone polymer and a silica together with an organic amine or salt thereof are heated at a high temperature and the resulting mixture vigorously remilled to render it soft and plastic, there after vulcanizing the mixture to a silicone rubber having very high tensile and tear strengths. While this method produces mixtures with desirable processing characteristics and that vulcanize to high strengths, the success of the venture depends on essentially complete removal of the amine or salt thereof during the heating step, else the mixture either cannot be vulcanized or does not fully vulcanized by the methods employed for silicone rubbers. Therefore the resulting rubber is neither strong nor rubbery. This requires either long heating time or very high temperatures.

Further, the mixture requires extensive ("vigorous") milling to render it soft and plastic. Thus, during the heating step required in the practice of said patent, the mixture sets to a very hard mass similar to a mixture that has crepe hardened. These requirements of long times of heating at high oven temperatures, e.g. 70 minutes at 250° C., after a 3 hour preheat, and the need to resoften the mixture after the heating step, are cost increasing factors in an already high cost material.

One object of this invention is to provide a new effective method of preparing a polysiloxane composition comprising a diorganopolysiloxane and a reinforcing filler that does not develop structure during preparation. Another object is a method of preparing such a composition that does not develop structure during storage at moderate temperatures. A further object is a method of preparing such a composition having good processability into elastomeric products. Still another object is a method of preparing such a composition thereafter capable of being vulcanized to a coherent strong rubbery solid elastomer. Other objects and advantages will be apparent from the following description.

This invention relates to a method comprising mixing (A) a diorganopolysiloxane, (B) a reinforcing filler, (C) a hydroxylated organosilicon compound in sufficient amount to prevent hardening of the mixture when heated as noted herein, and (D) from 0.01 to 50 parts of ammonium carbonate or ammonium bicarbonate, and thereafter heating the mixture at a temperature above 60° C. for a sufficient length of time that the mixture can be subsequently vulcanized to a rubber.

Diorganopolysiloxane (A) can have a viscosity as low as 10,000 cs. at 25° C. Preferably, the viscosity of the siloxane polymer is above 1,000,000 cs. at 25° C. and more preferably it is a non-flowing gum of viscosity greater than 10,000,000 cs. at 25° C. such as is commonly used in silicone rubber compositions. While essentially all of the units in diorganopolysiloxane (A) are diorganosiloxane units, small amounts of triorganosiloxane, monoorganosiloxane and $SiO_2$ units can be present as well known in the art. The organic radicals of diorganopolysiloxane (A) can be monovalent hydrocarbon radicals or halogenated monovalent hydrocarbon radicals.

Examples of the monovalent hydrocarbon radicals and halogenated monovalent hydrocarbon radicals that can be present in diorganopolysiloxane (A) include alkyl radicals such as methyl, ethyl, isopropyl, tert-butyl and octadecyl; alkenyl radicals such as vinyl, allyl, methallyl, decenyl and butadienyl; cycloalkyl radicals such as cyclopentyl and cyclohexyl; cycloalkenyl radicals such as cyclopentenyl and cyclohexadienyl; aryl radicals such as phenyl, xenyl and naphthyl; aralkyl radicals such as benzyl; alkaryl radicals such as tolyl; alkaralkyl radicals such as xylyl and the corresponding halogenated derivatives such as chloromethyl, 3,3,3-trifluoropropyl, α-chloro - α,β,β - trifluorocyclobutyl, 1 - bromovinyl, 2,3-dibromo - 2 cyclopentenyl, α,α - difluorobenzyl, perchlorophenyl, α,α,α-trifluorotolyl and 2,4,6-tribromobenzyl.

In addition, up to 50 percent of the silicon atoms of diorganopolysiloxane (A) can be connected by organic radicals that are selected from the group consisting of divalent hydrocarbon radicals, halogenated divalent hydrocarbon radicals, divalent hydrocarbon ether radicals, and halogenated divalent hydrocarbon ether radicals, and are attached to silicon through carbon atoms of said divalent organic radicals. Examples of divalent organic radicals that can be present include alkylene radicals such as $-CH_2-$, $-CH_2CH_2-$, $-CH_2CH(CH_3)-$, $-CH_2(CH_2)_6CH_2-$, $-CH_2CH(CH_3)CH_2-$, $-CH_2C(CH_3)_2CH_2-$ $-CH_2CH_2-O-CH_2CH_2-$; arylene radicals such as ortho, meta and para $-C_6H_4-$, $-C_6H_4OC_6H_4-$, $-C_6H_4-CH_2C_6H_4-$, $-C_{10}H_8-$, aralkylene radicals such as $-CH_2C_6H_4CH_2-$, and the like, and halogenated derivatives of the above said organic radicals, such as $-CH_2CH(CF_3)CH_2-$, $CH_2CHBrOCHBrCH_2-$ $-C_6Cl_4-$, $-C_6H_4CF_2C_6H_4-$, and $CH_2C_6F_4CH_2-$.

It is to be understood that diorganopolysiloxane (A) can be a polymer or copolymer, or can be a mixture of polymers and/or copolymers as above set forth.

The filler (B) is selected from the group consisting of silica and alumina. The filler should be reinforcing; that is, it should have a surface area of at least 50 square meters per gram as measured by nitrogen adsorption in the method described in ASTM Special Technical Bulletin No. 51, page 95 et seq. (1941). For the purpose of this invention there is no critical upper limit to the surface area. Depending on uses to which the product of the process of the invention may be used, the surface area of the filler can be as high as 900 square meters per gram or higher. Thus any silica or alumina having a surface area as above defined is operative in this invention.

Silicas which are operable in this invention include, for example, fume silicas obtained by burning silicon tetrachloride or orthosilicates, silica aerogels, silica xerogel, and the like, provided that said silica has a surface area greater than 50 square meters per gram. Silicas that have been processed such they they are hydrophobic (not wet by water) can be used in this invention so long as their surface areas are within the set limitations. One example of such a filter is that described by Tyler, U.S. Patent 3,015,645. While many of these fillers may not need further processing for use in silicone elastomers, nevertheless the use of these silicas in the process of this invention yields a superior product.

Aluminas which are applicable to this invention include, for instance, an amorphous alumina produced in a rapid high temperature vapor phase flame process and sold under the name of "Alon C" by Godfrey L. Cabot Company. Other aluminas can be employed, provided they have surface areas greater than 50 square meters per gram.

It is to be understood of course that combinations of two or more of the above fillers can be employed in the practice of this invention, and that in addition, fillers not so above described can also be present along with one or more of the above said fillers. However, these latter non-operative fillers can also be added after the operations of this invention are performed, since they play no part in the process of the invention.

The amount of reinforcing filler (B) to be used will depend on the desired end use of the product of the method of this invention. It will also depend on the nature of the filler. Generally from 10 to 200 parts of reinforcing filler (B) per hundred parts of diorganopolysiloxane (A) are employed. Where a high strength rubbery solid elastomer is desired, the preferred range is 20 to 60 parts of filler. It is to be understood that the product of this invention can be used for other purposes than above, and for these purposes other amounts of filler than the preferred range may be desired.

The hydroxylated organosilicon compound (C) of this invention must contain an average per silicon atom of from 0.1 to 2 silicon-bonded hydroxyl radicals, and in addition must contain per silicon atom an average of from 1 to 3 silicon-bonded organic radicals selected from the group consisting of monovalent, divalent and polyvalent hydrocarbon radicals or halogenated derivatives thereof.

These can include, for example, monovalent and halogenated monovalent hydrocarbon radicals such as methyl, ethyl, isopropyl, tert-butyl, dodecyl, vinyl, allyl, butadienyl, cyclopentyl, cyclohexyl, cyclopentenyl cyclohexadienyl, phenyl, benzyl, naphthyl, xenyl, xlyl, tolyl, 3,3,3-trifluoropropyl, α - chloro - α,β,β - trifluorocyclobutyl, 1 - bromovinyl, 2,3 - dibromocyclopentyl, α,α difluorobenzyl, perchlorophenyl, α,α,α - trifluorotolyl and 2,4,6-tribromobenzyl; divalent and halogenated divalent hydrocarbon and hydrocarbon ether radicals such as $-CH_2-$, $-CH_2CH_2-$, $-CH_2CH(CH_3)-$ $-CH_2(CH_2)_6CH_2-$, $-CH_2CH(CH_3)CH_2-$ $-CH_2C(CH_3)_2CH_2-$, $-CH_2CH_2OCH_2CH_2-$, ortho, meta and para $-C_6H_4-$, $-C_6H_4CH_2C_6H_4-$, $-C_6H_4OC_6H_4-$ $-C_{10}H_8-$, $-CH_2C_6H_4CH_2-$, $-CH_2CH(CF_3)CH_2-$ $-CH_2CHBrOCHBrCH_2-$, $-C_6H_3Cl-$ $-C_6H_4CF_2C_6H_4-$, and $-CH_2C_6F_4CH_2-$; and trivalent hydrocarbon radicals such as $1,3,5\equiv C_6H_3$.

Compound (C) can be for instance, a silanol, a linear or branched siloxanol, a linear or branched silcarbonol, or a partially condensed hydroxyl containing siloxane resin. It can be a single material or a mixture of materials. It can contain any combination of the organic radicals per above. It can be any of these configurations witihn the limits set forth in the preceding paragraph.

The amount of compound (C) to be used in any given instance depends on the amount and type of filler (B) and the particular configuration of compound (C). Thus the minimum or optimum quantity of (C) must be determined for each combination of (A), (B) and (C). However, the amount of compound (C) that will be needed in any given case may be easily determined by trial. An amount that prevents hardening of the mixture during heating step (2) is a sufficient quantity. By a series of trials the minimum amount of compound (C) can quite easily be determined, but it is not necessary nor important that this exact amount be used. Excesses of up to double the minimum requirement of (C) are not detrimental, although economic factors may determine the need to use only the minimum necessary. It is an advantage of the process of this invention that the quantity of compound (C) above a certain easily determined minimum is not critical. Thus, amounts ranging from 1 to 200 parts by weight per hundred parts of (A) of compound (C) can be used in the practice of this invention.

Ammonium carbonate or ammonium bicarbonate (D) can be used in any amount from 0.005 to 50 parts by weight per hundred parts of (A). To insure thorough dispersion of the compound it is preferable to use more than 0.2 part, but it is not necessary. A preferred range is 0.2 to 10 parts. More than 10 parts and up to 50 may be used. An amount of ammonium carbonate or ammonium bicarbonate greater than 50 parts, while it will not change the process, is wasteful and not necessary.

It is more preferable, where control purpose permit, to use less than two parts of ammonium carbonate or ammonium bicarbonate, as the heating time subsequent to mixing is reduced thereby.

For easier dispersal it is convenient, but not necessary, to pulverize the ammonium carbonate or ammonium bicarbonate prior to adding it to the mixture. The pulverized compound can be kept free-flowing by adding 1 to 5 percent by weight of an amorphous silica such as a fume silica, an anti-caking procedure well-known in the art. The inclusion of this small amount of silica has no effect on the process.

The compounds described above can be mixed in any desired manner. They may be blended in a dough-type mixer such as is used in rubber production facilities, or they may be mixed by dispersion in an inert volatile organic solvent. Examples of applicable solvents include aliphatic hydrocarbons such as pentane, hexane and heptane; aromatic solvents such as benzene and toluene; ethers such as diethyl, methyl-n-butyl, and dipropyl ether; polyethers such as ethylene glycol dimethylether; nitriles, and other solvents that do not react with components (A), (B), (C) or (D). Preferably the compounds are brought together on a two-roll rubber mill and mixed well in the usual way. Regardless of the method of mixing, the order of addition of the various components is completely unimportant. The process is independent of the method of mixing or the order of addition. It goes without saying that thorough mixing will result in a more desirable product. However, it is not necessary to mix longer than that time necessary to obtain uniformity.

In addition to the materials listed above, other materials may be added to the mixture as are commonly used in silicone rubber, such as pigments, compression set additives, and the line. Organic peroxides and other materials which ordinarily act to vulcanize silicone rubber should of course be excluded.

Following mixing of the components discussed above, it is necessary to heat the mixture for a length of time above 60° C. that it can be subsequently vulcanized by the usual catalysts employed for silicone rubber. The heating time depends on the temperature used, a lower temperature requiring a longer time and a higher temperature allowing a shorter heating time.

The heating can be done in any desired way. It may be done either with or without mixing during the heating. A distinctive feature in the operation of this invention is that the mixture does not harden during this heating step, so that mixing during heating is not necessary, but can be employed if desired. For instance, if the mixture is prepared on a rubber mill, the heating step can be accomplished by heating the rolls, continuing to mill the mixture. If the mixture is prepared in a solvent, heating to expedite removal of said solvent may be sufficient. A preferred method of heating a mixture made without solvent, by reasons of its simplicity, is to transfer said mixture on a suitable support to an air-circulating oven operating at a temperature above the minimum already stated. Under these conditions of static heating a total oven time at 150° C. of one hour for a sample of about ⅛ inch thickness is sufficient. Alternate conditions are for instance 8 hours in an oven operating at 100° C. It is to be understood that the times stated are total residence times, so that for part of the time the sample is being heated to the temperature of the oven. Thus, thicker sections would require longer to heat to the oven temperature and might therefore require longer total residence times in the oven than thinner sections.

The conditions of the heating step must be met, else the product cannot subsequently be vulcanized to an elastomer. The precise reasons for the necessity are not clearly understood, but it is known to be related to decomposition of the ammonium carbonate or ammonium bicarbonate, for when larger quantities of said compound are used, longer heating times are necessary. The criterion of vulcanizability is the simplest test of whether the heating conditions are satisfactory.

Vulcanizing agents that can be used with the product of this invention include organic peroxides such as benzoyl peroxide, dicumyl peroxide, tert-butylperbenzoate, and the like which require heating to effect vulcanization; combinations of silicate esters such as isopropylorthosilicate, ethylpolysilicate and the like with metal-organic soaps such as lead-2-ethylhexoate, dibutyl tin dilaurate, and the like that vulcanize at room temperature; combinations of the above said metal-organic soaps and an organosilicon compound containing an average of two or more silicon-bonded hydrogen atoms per molecule such as $(CH_3HSiO)_x$, wherein the average for $x$ is 3 or more and the molecules are linear and/or cyclic,

$CH_3C_6H_5HSi[OSi(CH_3)_2]_xOSiHCH_3C_6H_5$ wherein $x$ is 0, 1 or more, and the like; combinations of the above said organosilicon compounds containing silicon-bonded hydrogen atoms with a catalyst containing platinum, such as $PtCl_4$, $H_2PtCl_6$, $PtO_2$ and the like; and sulfur vulcanization methods that utilize, sulfur and/or organic sulfur compounds such as tetramethylthiuram disulfide and others as are well known in the art to effect sulfur vulcanization by subsequent heating. Any of the above said methods of vulcanization will vulcanize the product of this invention.

The method of this invention produces a mixture, suitable for subsequent vulcanization to a strong rubbery silicone rubber, which mixture does not harden during the preparation.

The following examples are illustrative only and should not be construed as limiting the invention which is properly delineated in the claims.

*Example 1*

One hundred parts by weight of a polysiloxane containing 94.36 mol percent dimethylsiloxane units, 5.5 mol percent diphenylsiloxane units and 0.14 mol percent of methylvinylsiloxane units and having a Williams plasticity of 0.060 inch were mixed with 40 parts of a fume silica having a surface area of 400 square meters per gram, 16 parts of diphenylmethylsilanol, and 0.2 part of ammonium carbonate on a conventional 2-roll rubber compounding mill. It was removed from the mill in a single one-eighth inch sheet and placed on a piece of heavy aluminum foil in an air-circulating oven operating at 150° C. for one hour. When it was removed and cooled the sample was found to be soft and workable with the fingers. One part of dichlorobenzoyl peroxide as a paste in silicone oil was added to a portion of the mixture by milling, and the piece was molded into a test slab by heating in a mold for 5 minutes at 125° C. and 5000 pounds per square inch pressure. Thereafter the vulcanized rubber was heated first one hour at 150° C. and then 4 hours at 250° C. in an air-circulating oven. Physical properties were determined and appear as sample A below. A similar sample was run, except the ammonium carbonate was omitted. This sample hardened when heated subsequently to mixing, and required milling to soften it to a plastic mass. The sample was vulcanized and further oven-aged as above. Physical properties of this sample appear as sample B below.

| Sample | Hardness | Tensile Strength | Elongation | Tear Strength |
|---|---|---|---|---|
| A | 36 | 1,420 | 710 | 218 |
| B | 53 | 1,250 | 340 | 104 |

*Example 2*

One hundred parts by weight of the same polysiloxane as in Example 1 were mixed with 40 parts of the same fume silica as in Example 1, 10 parts of diphenylsilanediol and 1 part of ammonium carbonate. The mixture was heated as in Example 1 for 2 hours in an air-circulating oven operating at 150° C. The cooled sample was soft enough to be worked with one's fingers. One part of dichlorobenzoyl peroxide dispersed in silicone oil was milled into the sample, and the sample press vulcanized and oven cured as in Example 1. Physical properties were determined with the following results:

| | |
|---|---|
| Hardness | 28 |
| Tensile strength p.s.i. | 1640 |
| Elongation | 710 |
| Tear strength p.p.i. | 200 |

Example 3

One hundred parts by weight of a polymer of 99.5 mol percent 3,3,3-trifluoropropylmethylsiloxane units and 0.5 mol percent methylvinylsiloxane units having a Williams plasticity of 0.100 inch was mixed with 50 parts of a fume silica having a surface area of 200 square meters per gram, 16 parts of a 3,3,3-trifluoropropylmethylsiloxane fluid polymer having an average of 0.2 silicon-bonded hydroxyl radicals per silicon and having a viscosity of about 200 cs. at 25° C. and 2 parts of ammonium carbonate, on a two-roll rubber mill and thereafter heated as in Example 1 for 2 hours in a 150° C. air-circulating oven. The cooled sample was stiff but could be worked with the fingers. One part of dichlorobenzoyl peroxide contained in silicon oil was added to the sample by milling. The sample was press vulcanized as in Example 1 and thereafter oven-cured 24 hours in a 150° C. air-circulating oven. Physical properties were determined with the following results:

| | |
|---|---|
| Hardness | 59 |
| Tensile strength p.s.i. | 1770 |
| Elongation percent | 310 |
| Tear strength p.p.i. | 130 |

Example 4

A mixture of one hundred parts by weight of the polymer used in Example 1 was mixed with 37 parts of a fume silica having a surface area of 400 square meters per gram, 18.5 parts of a resinous toluene-soluble siloxane containing an average per silicon atom of one phenyl radical and 0.32 silicon-bonded hydroxyl radicals, and 0.64 part of ammonium carbonate by dispersing the ingredients in enough toluene to give a thick, but stirrable mixture. The toluene was partially removed by slowly transferring the dispersion to a 2-roll rubber mill, the rolls of which were heated to about 110° with steam, and milling until the remaining material could be removed in a firm sheet. The remainder of the toluene was removed by heating the mixture in a 150° C. air-circulating oven for four hours. The sample showed no sign of hardening as a result of this treatment. One part of dichlorobenzoyl peroxide was added and the sample press vulcanized and thereafter oven-cured as in Example 1. The rubber had the following properties:

| | |
|---|---|
| Hardness | 61 |
| Tensile strength p.s.i. | 1520 |
| Elongation percent | 560 |
| Tear strength p.p.i. | 187 |

Example 5

When any of the polymers listed below are substituted for the polymer of Example 2, soft mixtures are obtained from the oven-heating step of the preparation per this invention. Further, the mixtures vulcanize with the conventional catalysts used for silicone rubber to strong silicone elastomers.

(1) A fluid polymer containing 99.8 mol percent dimethylsiloxane units and 0.2 mol percent dimethylvinylsiloxane units and having a viscosity of 10,000 cs. at 25° C.

(2) A copolymer containing 30 mol percent phenylmethylsiloxane units, 69.5 mol percent ethylmethylsiloxane units, and 0.5 mol percent diallylsiloxane unit and having a viscosity of 1,000,000 cs. at 25° C.

(3) A copolymer containing 80 mol percent phenylmethylsiloxane units and 20 mol percent diphenylsiloxane units and having a Williams plasticity of 0.150 inch.

(4) A mixture of 40 percent by weight of a polymer composed essentially of $\alpha,\alpha,\alpha$-trifluorotolylmethylsiloxane units and having a viscosity of 50,000 cs. at 25° C. and 60 percent by weight of a copolymer containing 12.5 mol percent xenylmethylsiloxane units, 0.5 mol percent methylcyclopentenyl siloxane units, 86.9 mol percent dimethylsiloxane units, 0.04 mol percent phenylsiloxane units, 0.04 mol percent chloromethyldimethylsiloxane units, and 0.02 mol percent $SiO_2$ units having a Williams plasticity of 0.025 inch.

(5) A polymer wherein substantially all of the silicon atoms contain two methyl radicals and the silicon atoms are linked 75 percent through oxygen atoms and 25 percent through para-phenylene radicals, said polymer being a polycrystalline mass at room temperature and completely soluble in toluene.

(6) A copolymer containing 50 mol percent trifluoropropylmethylsiloxane units, 49.75 mol percent dimethylsiloxane units, and 0.25 mol percent vinylmethylsiloxane units, having a Williams plasticity of 0.110 inch.

Example 6

When 60 parts of an alumina filler having a surface area of 50 to 100 square meters per gram and sold under the trade name "Alon C" is substituted for the silica of Example 1, smooth soft materials are obtained through the process of this invention. The mixture can be vulcanized with, for instance, 0.5 part of tert-butylperbenzoate, to a strong rubbery silicone elastomer.

Example 7

One hundred parts of the polymer of Example 1 were mixed with 60 parts of a silica prepared according to Tyler U.S. Patent 3,015,645, 5 parts of diphenylmethylsilanol and 10 parts of ammonium carbonate by milling, and thereafter placed in an air-circulating oven operating at 177° C. for 90 minutes. The cooled sample was soft and workable with the fingers. It was catalyzed with 0.5 part of tert-butylperbenzoate, press-vulcanized 10 minutes at 150° C. and 1500 p.s.i., thereafter cured in air-circulating ovens one hour at 150° C. and then 4 hours at 250° C. and physical properties determined as sample A below. Another sample was prepared in the same way except that the diphenylmethylsilanol and ammonium carbonate were omitted. It was not soft after the oven heating step, requiring one minute of milling to render it soft. After vulvanization and further oven-cure it was formed to have the properties shown as sample B.

| Sample | Hardness | Tensile Strength, p.s.i. | Elongation, percent | Tear Strength, p.p.i. |
|---|---|---|---|---|
| A | 49 | 2,380 | 650 | 210 |
| B | 50 | 2,140 | 590 | 228 |

Example 8

When (A) any of the polymers listed below are mixed with (B) 45 parts by weight per hundred parts of (A) of a silica aerogel having a surface area of 150 square meters per gram, (C) 14 parts by weight per hundred parts of (A) of an organosilicon compound containing per silicon atom an average of 2 methyl radicals and 0.14 silicon-bonded hydroxyl radicals, and (D) 0.5 part by weight per hundred parts of (A) of ammonium carbonate, and thereafter heated 8 hours at 100° C. in an air-circulating oven, the resulting mixtures are soft, easily workable materials that can subsequently be vulcanized to strong rubbery elastomers.

(1) The polymer of Example 1.

(2) A copolymer containing 20 mol percent 3,3,3-trifluoropropylmethylsiloxane units, 79.5 mol percent dimethylsiloxane units, and 0.5 mol percent divinylsiloxane units and having a Williams plasticity of 0.080 inch.

(3) A copolymer containing 96 mol percent dimethylsiloxane units, 3.95 mol percent methylvinylsiloxane units, and 0.05 mol percent trimethylsiloxane units, having a viscosity of one million centistokes at 25° C.

*Example 9*

One hundred parts by weight of the polymer of Example 3 and 2 parts of a polymer containing 96 mol percent of dimethylsiloxane units and 4 mol percent of methylvinylsiloxane units having a Williams plasticity of 0.060 inch, were mixed with 40 parts of the silica of Example 1, 12 parts of diphenylmethylsilanol and 2 parts of ammonium carbonate and thereafter heated 2 hours at 150° C. in an air-circulating oven. The mixture was soft and easily workable. One part of dichlorobenzoyl peroxide contained in silicone oil was added and the mixture was vulcanized and oven cured as in Example 3. Physical properties were as follows:

| | |
|---|---|
| Hardness | 40 |
| Tensile strength p.s.i. | 1260 |
| Elongation percent | 660 |
| Tear strength p.p.i. | 247 |

Similar results were obtained when a polymer containing 99.9 mol percent dimethylsiloxane units and 0.1 mol percent methylvinylsiloxane units and having a Williams plasticity of 0.090 inch was substituted for the mixture of polymer shown above.

*Example 10*

A silicone rubber is prepared according to Example 1, using the same ingredients, heating and curing times and temperatures except as follows: sample A contains no ammonium carbonate or ammonium bicarbonate, sample B contains 0.2 part by weight ammonium carbonate and sample C contains 0.33 part by weight of ammonium bicarbonate. The softening times are 35, 10 and 15 seconds for samples A, B and C respectively, 35 seconds being much more brittle than the other two. The physical properties of these samples appear below:

| Sample | Hardness | Tensile Strength, p.s.i. | Elongation, percent | Tear Strength, p.p.i. |
|---|---|---|---|---|
| A | 51 | 1,330 | 630 | 142 |
| B | 44 | 1,380 | 700 | 177 |
| C | 46 | 1,280 | 640 | 163 |

That which is claimed is:
1. A method comprising
   (1) mixing
      (A) a diorganopolysiloxane having a viscosity of at least 10,000 cs. at 25° C. in which the organic radicals are selected from the group consisting of monovalent hydrocarbon radicals and halogenated monovalent hydrocarbon radicals and in which up to 50 percent of the silicon atoms in said siloxane can be connected by organic radicals selected from the group consisting of divalent hydrocarbon radicals, halogenated divalent hydrocarbon radicals, divalent hydrocarbon ether radicals and halogenated divalent hydrocarbon ether radicals which are attached to silicon by silicon to carbon linkages,
      (B) a reinforcing filler selected from the group consisting of silica and alumina and having a surface area of at least 50 square meters per gram as measured by nitrogen adsorption in the method of ASTM Special Technical Bulletin No. 51, page 95 et seq., 1941,
      (C) an amount of organosilicon compound sufficient to prevent hardening of the mixture during hereinafter stated step (2), said compound (C) containing an average per silicon atom of from 0.1 to 2 silicon-bonded hydroxyl radicals and containing an average per silicon atom of from 1 to 3 silicon-bonded organic radicals selected from the group consisting of monovalent hydrocarbon radicals, monovalent halogenated hydrocarbon radicals, divalent hydrocarbon radicals and divalent halogenated hydrocarbon radicals, said divalent radicals being bonded to silicon atoms by silicon-carbon linkages, with any remaining silicon valences being satisfied by siloxane oxygen atoms, and
      (D) from 0.005 to 50 parts by weight per hundred parts of (A) of a salt selected from the group consisting of ammonium carbonate and ammonium bicarbonate, and thereafter
   (2) heating said mixture at a temperature of at least 60° C. for a sufficient length of time that the mixture may subsequently be vulcanized to a solid coherent elastomer.

2. A method comprising
   (1) mixing
      (A) a diorganopolysiloxane having a viscosity of at least 10,000 cs. at 25° C. in which the organic radicals are selected from the group consisting of monovalent hydrocarbon radicals and halogenated monovalent hydrocarbon radicals and in which up to 50 percent of the silicon atoms in said siloxane can be connected by organic radicals selected from the group consisting of divalent hydrocarbon radicals, divalent halohydrocarbon radicals, divalent hydrocarbon ether radicals and halogenated divalent hydrocarbon ether radicals which are attached to silicon by silicon to carbon linkages,
      (B) a reinforcing filler selected from the group consisting of silica and alumina and having a surface area of at least 50 square meters per gram as measured by nitrogen adsorption in the method of ASTM Special Technical Bulletin No. 51, page 95 et seq., 1941,
      (C) an amount of organosilicon compound sufficient to prevent hardening of the mixture during hereinafter stated step (2), said compound (C) containing an average per silicon atom of from 0.1 to 2 silicon-bonded hydroxyl radicals and containing an average per silicon atom of from 1 to 3 silicon-bonded organic radicals selected from the group consisting of monovalent hydrocarbon radicals, monovalent halogenated hydrocarbon radicals, divalent hydrocarbon radicals and divalent halogenated hydrocarbon radicals, said divalent radicals being bonded to silicon atoms by silicon-carbon linkages, with any remaining silicon valences being satisfied by siloxane oxygen atoms, and
      (D) from 0.2 to 10 parts by weight per hundred parts of (A) of a salt selected from the group consisting of ammonium carbonate and ammonium bicarbonate, and thereafter
   (2) heating said mixture at a temperature above 60° C. for a sufficient length of time that the mixture may subsequently be vulcanized to a solid coherent elastomer.

3. The method of claim 2 wherein the monovalent organic radicals of (A) are methyl, phenyl and vinyl and the silicon to silicon linkages are through oxygen, (B) is silica and the organic radicals of (C) are methyl and phenyl.

4. The method of claim 2 wherein the monovalent organic radicals of (A) are methyl and vinyl and the silicon to silicon linkages are through oxygen, the filler (B) is silica, and the organic radicals of (C) are methyl and phenyl.

5. The method of claim 2 wherein the monovalent organic radicals of (A) are 3,3,3-trifluoropropyl, methyl and vinyl and the silicon to silicon linkages are through oxygen, the filler (B) is silica, and the organic radicals of (C) are trifluoropropyl and methyl.

6. The method of claim 2 wherein the monovalent hydrocarbon radicals of (A) are methyl, phenyl and vinyl and the silicon to silicon linkages are through oxygen, the filler (B) is silica, and the organic radicals of (C) are phenyl.

7. The method of claim 2 wherein the monovalent hydrocarbon radicals of (A) are methyl, phenyl and vinyl and the silicon atoms are linked with siloxane oxygen, the filler (B) is silica, and the organic radicals of (C) are methyl.

8. The method of claim 2 wherein the monovalent hydrocarbon radicals of (A) are methyl and vinyl and the silicon atoms are linked with siloxane oxygen, the filler (B) is silica, and the organic radicals of (C) are methyl.

9. The method of claim 2 wherein the monovalent hydrocarbon radicals of (A) are methyl and vinyl and the silicon atoms are linked with oxygen atoms, the filler (B) is silica, and the organic radicals of (C) are phenyl.

10. The method of claim 2 wherein the monovalent hydrocarbon radicals of (A) are 3,3,3-trifluoropropyl, methyl, and vinyl and the silicon atoms are linked with oxygen atoms, the filler (B) is silica, and the organic radicals of (C) are phenyl and methyl.

11. The method of claim 2 wherein the monovalent hydrocarbon radicals of (A) are 3,3,3-trifluoropropyl, methyl and vinyl and the silicon atoms are linked with oxygen atoms, the filler (B) is silica, and the organic radicals of (C) are phenyl.

12. A composition of matter which does not crepe-age consisting essentially of a mixture of (A) a diorganopolysiloxane having a viscosity of at least 10,000 cs. at 25° C. in which the organic radicals are 3,3,3-trifluoropropyl, methyl and vinyl and the silicon to silicon linkages are through oxygen, (B) a reinforcing silica filler having a surface area of at least 50 square meters per gram as measured by nitrogen adsorption in the method of ASTM Special Technical Bulletin No. 51, page 95 et seq., 1941, (C) an amount of organosilicon compound sufficient to prevent hardening of the mixture during hereinafter heating step, said compound (C) containing an average per silicon atom of from 0.1 to 2 silicon-bonded hydroxyl radicals and containing an average per silicon atom of from 1 to 3 silicon-bonded 3,3,3-trifluoropropyl radicals and methyl radicals with any remaining silicon valences being satisfied by siloxane oxygen atoms, and (D) from 0.005 to 50 parts by weight per hundred parts of (A) of a salt selected from the group consisting of ammonium carbonate and ammonium bicarbonate, said mixture having been heated at a temperature of at least 60° C. for a sufficient length of time that the mixture can subsequently be vulcanized to a solid coherent elastomer.

References Cited by the Examiner
UNITED STATES PATENTS

| | | |
|---|---|---|
| 2,596,085 | 5/1952 | Wormuth. |
| 2,863,846 | 12/1958 | Tyler _____ 260—46.5 XR |
| 2,890,188 | 6/1959 | Konkle et al. ____ 260—46.5 XR |
| 3,031,352 | 4/1962 | Bobear _____ 260—46.5 XR |
| 3,031,366 | 4/1962 | Bueche et al. ____ 260—46.5 XR |
| 3,061,578 | 10/1962 | Nitzsche et al. _____ 260—37 XR |

MORRIS LIEBMAN, *Primary Examiner.*

ALEXANDER H. BRODMERKEL, *Examiner.*

A. H. KOECKERT, *Assistant Examiner.*